(12) United States Patent
Lappe et al.

(10) Patent No.: US 11,642,828 B2
(45) Date of Patent: May 9, 2023

(54) APPARATUS AND METHOD FOR FORMING PLASTIC PREFORMS INTO PLASTIC CONTAINERS WITH TWO PREFORM STORES

(71) Applicant: KRONES AG, Neutraubling (DE)

(72) Inventors: Ulrich Lappe, Neutraubling (DE); Jochen Hirdina, Regensburg (DE); Robert Aust, Illkofen (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/550,009

(22) Filed: Dec. 14, 2021

(65) Prior Publication Data
US 2022/0288836 A1  Sep. 15, 2022

(30) Foreign Application Priority Data
Mar. 9, 2021 (DE) ............ 10 2021 105 667.5

(51) Int. Cl.
*B29C 49/42* (2006.01)
*B29C 49/64* (2006.01)
*B29C 49/78* (2006.01)
*B29L 31/00* (2006.01)

(52) U.S. Cl.
CPC ...... *B29C 49/4205* (2013.01); *B29C 49/6409* (2013.01); *B29C 49/786* (2013.01); *B29C 49/78* (2013.01); *B29L 2031/712* (2013.01)

(58) Field of Classification Search
CPC .......... B29C 49/4205; B29C 49/42065; B29C 49/42071
See application file for complete search history.

(56) References Cited

U.S. PATENT DOCUMENTS

| | | | |
|---|---|---|---|
| 4,223,778 A | 9/1980 | Kontz | |
| 6,591,967 B1 * | 7/2003 | Doudement | B65G 47/70 198/441 |
| 8,591,779 B2 * | 11/2013 | Senn | B29C 49/4205 425/522 |
| 2020/0346394 A1 | 11/2020 | Poeschl et al. | |

FOREIGN PATENT DOCUMENTS

DE 102017112455 A1 12/2018
EP       3141500 A1  3/2017

* cited by examiner

*Primary Examiner* — Robert B Davis
(74) *Attorney, Agent, or Firm* — Schmeiser, Olsen & Watts, LLP

(57) ABSTRACT

Provided is a device for forming plastic preforms into plastic containers, having a feed device for feeding the plastic preforms to the device, at least one first preform store, a multiplicity of plastic preforms being arranged unsorted in the preform store, and having an alignment device for bringing the plastic preforms into a predetermined position before feeding them to the device. The device includes at least a second preform store, wherein a plurality of plastic preforms of exactly one production batch can be accommodated in each preform store.

11 Claims, 1 Drawing Sheet

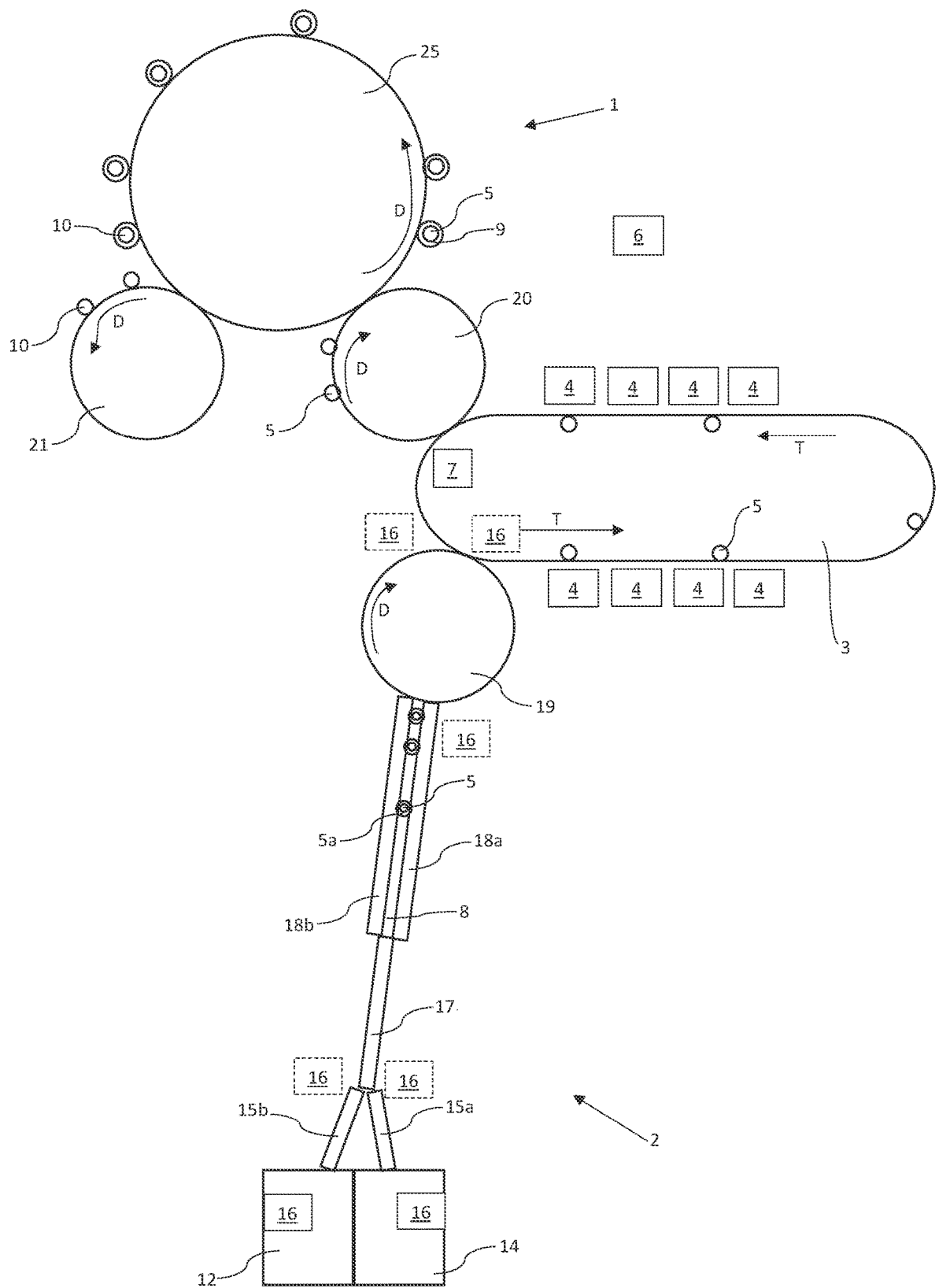

APPARATUS AND METHOD FOR FORMING PLASTIC PREFORMS INTO PLASTIC CONTAINERS WITH TWO PREFORM STORES

CROSS-REFERENCE TO RELATED APPLICATION

This application claims priority to German Application No. 10 2021 105 667.5, having a filing date of Mar. 9, 2021, the entire contents of which are hereby incorporated by reference.

FIELD OF TECHNOLOGY

The following relates to an apparatus and a method for forming plastic preforms into plastic containers. Such apparatus and methods have been known in the conventional art for a long time. In this connection, it is known from the internal conventional art of the applicant that apparatus for forming plastic preforms and, in particular, blow-moulding machines are generally associated with a single preform store (silo) for preforms, into which the preforms are usually tipped from delivered cartons, so-called octabins. The preforms are discharged from this silo via, for example, conveyor belts and/or an elevator and fed to an alignment device.

BACKGROUND

In this alignment device, the preforms are aligned in such a way that an ordered preform flow is created, which is fed to the blowing machine. In a (linear) oven of the blow molding machine, this preform mass flow is then subjected to continuous heating after alignment. If the material quality is homogeneous and the heating behaviour is the same for all preforms, all preforms will have the same heating profile or temperature at the end of the oven, whereby uniform results can be achieved in the subsequent forming or stretch blow moulding process in the blow moulding machine.

From the applicant's internal conventional art, it is known and customary that preforms from different octabins are poured one after the other into the preform store, whereby preforms from different production batches are mixed with each other. If different preform qualities are present, these also mix. If these qualities are different in terms of heat absorption, this leads to varying heating results in the subsequent linear oven, which in turn leads to strongly fluctuating bottle qualities in the subsequent stretch blow molding process, or no bottles can be produced at all because the preforms simply burst during the blow molding process.

SUMMARY

An aspect relates to an apparatus and a method with which a uniform quality of the plastic preforms to be formed or of the formed plastic containers can be achieved.

Embodiments of the invention are therefore directed to an apparatus for forming plastic preforms into plastic containers, comprising a feeding means for feeding the plastic preforms to the apparatus, at least one first preform store, wherein a plurality of plastic preforms being arranged unsorted in the preform store, and an alignment device for bringing the plastic preforms into a pre-determined position before feeding them to the apparatus.

According to embodiments of the invention, the apparatus thereby comprises at least a second preform store, wherein a plurality of plastic preforms of exactly one production batch can be accommodated in each preform store.

Accordingly, it is proposed according to embodiments of the invention to assign at least two preform stores to the apparatus instead of a single preform store as is usual in the conventional art, into each of which only one octabin of preforms or one production batch of preforms is tipped. In an embodiment, only preforms from one preform store are fed to the downstream machine and, in particular, to the blow molding machine, so that a mixing of preforms of different production batches is prevented. The preforms are unsorted within the preform store and are in a so-called preform chute.

The supply of preforms from one preform store, in particular the first preform store, takes place until the latter is completely emptied. Only then the supply of preforms from the other preform store, in particular the second preform store to the blow molding machine begins, and thus of preforms from another production batch.

This procedure also ensures a continuous flow of preforms to the blow molding machine or a downstream machine without major interruptions, since the supply does not have to be interrupted by refilling the preform store. In the meantime, the emptied preform store can be refilled with preforms of a new production batch, while the supply of preforms from the second preform storage continues. Once the second preform store has been emptied, preforms can be supplied again from the first preform store and the second, now emptied, preform store can be filled with preforms from a new production batch. The supply of preforms from a preform store can be prevented in a simple manner by, for example, switching off a conveyor belt at the outlet of the silo or a blocking finger in the supply to the blowing machine or the like.

This also avoids that individual preforms of a production batch remain in the storage significantly longer than other preforms of the same batch, which often occurs when only one storage is used and several batches are mixed. Accordingly, the FIFO (first in first out) principle is also supported by the provision of several, and in particular two, preform stores.

In particular, different batch qualities remain separated. The time of the changeover to another production batch can also be communicated to the system via a control device. Due to the consistent preform quality, an excessively high scrap rate due to blowing errors is also avoided.

In particular, as will be explained in more detail below, suitable sensors are provided which, for example, monitor the radiation absorption behaviour of the individual preform batches (e.g., IR absorption measurement via IR spectroscopy and/or measurement of differences in transmission in the visible light spectrum) and send this information to the oven, which adjusts the heating power accordingly, if necessary, or completely blocks the feed of the new batch if the deviation is too great, in order to force an operator intervention.

After production in an injection moulding machine, for example, the preforms are usually stored in batches in so-called octabins and transported to the next production location or a warehouse. This already ensures that no mixing of individual production batches takes place until their further treatment in the forming device or the like.

The above-mentioned feeding device is a conveyor belt which conveys the preforms from the preform store to the alignment device. The alignment device is a roller sorter.

However, a disc sorter would also be conceivable. In an embodiment, an elevator is provided between the preform stores and the alignment device.

The roller sorter comprises two guide rails which are aligned parallel to each other. The distance between these guide rails is so large that a base body of the preform can pass through, but a support ring (or other projection over the preform body) of the preform cannot. The support ring rests on the guide rails, so that the preforms can slide along the guide rails. For this purpose, the guide rails are also arranged at an angle of inclination of between 11° and 60°, between 15° and 55°, or between 20° and 50° to the ground surface. In the case of preforms without a support ring, the preforms are suspended from the guide rails by their tamper evidence ring.

In an embodiment, the preform stores each have at least one sensor device which detects a filling level of the preform store. This sensor device can thereby communicate with a control device which controls the emptying of the preform stores in order to be able to initiate the emptying of the other preform store in the event of a low filling level. The filling level detection of the preform store can also be detected by a weight detection.

In an embodiment, the preform stores are each suitable and intended to hold at least a volume of 2 m$^3$ of preforms, at least 1.5 m$^3$ of preforms, or at least 1.2 m$^3$ of preforms.

The first preform store and the second preform store are arranged relative to each other or to the feeding device in such a way that the gap between the preforms is as small as possible when another preform store is to be accessed for emptying. It is conceivable that the preform stores are arranged parallel to one another or one behind the other or at an angle different from zero degrees to the feeding device or the transport path of the preforms.

The plastic containers are plastic bottles and in particular beverage containers or beverage bottles. These are made of a material selected from a group of materials comprising PET, HDPE, PP and the like.

In an embodiment, the apparatus comprises a control device suitable and intended for controlling the supply of plastic preforms to the apparatus such that only plastic preforms from one of the two preform stores are first supplied to the apparatus. In an embodiment, the control device controls the first preform store and the second preform store in such a way that after the one preform store has been emptied, the plastic preforms are fed to the apparatus from the other preform store. As illustrated above, for example, preforms are first fed from the first preform store and then preforms are fed from the second preform store, thereby preventing mixing of different production batches. It is also possible that preforms are first fed from the second preform store and then preforms are fed from the first preform store.

In an embodiment, the supply of plastic preforms from the first preform store and the supply of plastic preforms from the second preform store is continuous. That is, as soon as the first or second preform store has been emptied, feeding of preforms from the other preform store is started immediately. As mentioned above, this is controlled by sensor devices which detect a filling level of the preform stores. It allows the changeover to the other preform store without major interruptions or gaps in the preform supply, and production in the blow molding machine can continue unhindered.

In an embodiment, a heating device comprising a plurality of heating elements for heating the plastic preforms is arranged between the forming device and the feeding device. More precisely, the heating device is arranged between the device for forming and the alignment device. The plastic preforms are thereby heated to a temperature necessary for blow molding. The heating elements are heating boxes, such as infrared radiators or microwave heating devices. In an embodiment, a feed rail can be arranged between the alignment device and the heating device, which feed rail is arranged at an angle of inclination between 11° and 60°, between 15° and 55°, or between 20° and 50° to the ground surface, so that the preforms are fed to the heating device via the gravity principle.

In an embodiment, the plurality of heating elements is arranged along the transport path of the preforms through the heating device. The plastic preforms are thereby transported in the heating device along a substantially rectilinear transport path, wherein the plurality of heating elements being arranged along this rectilinear transport path. The heating elements are arranged in a stationary manner, so that the plastic preforms are moved past them during transport and are heated or brought to a predetermined temperature.

The heating device has a circumferential transport means such as conveyor belts or holding devices such as clamps arranged on the transport means, which grip the plastic preforms above the support ring.

The heating device comprises a first and a second linear transport path, which are arranged parallel to each other. The first linear transport path and the second linear transport path are connected to each other via curved sections.

The apparatus for forming plastic preforms into plastic containers, which is a blow molding machine, is arranged downstream of the heating device and forms the plastic preforms into plastic containers after heating in the heating device. Accordingly, the plastic preforms are fed to the blow molding machine after heating in the heating device and expanded into plastic containers by being acted upon by a liquid or gaseous medium within blowing stations.

In an embodiment, the apparatus and, in particular, the feed device and/or the first and second preform stores have at least one sensor device which detects at least one value which is characteristic of the ability of the preforms to absorb temperature. In an embodiment, this sensor device is thereby arranged in each case at a transfer point of the preform store to the feed device. In an embodiment, the apparatus has several sensor devices which determine several values which are characteristic of the ability of the preforms to absorb temperature and/or which determine a filling level of the preform store. In an embodiment, the heating device thereby comprises a further control device which controls the heating power of the heating elements in dependence on the characteristic value detected by the sensor device.

Accordingly, the sensor device serves in particular to detect the temperature of the preforms or a value characteristic of the temperature of the preforms and to adjust the subsequent heating process or the heating power of the heating elements accordingly if individual preforms have a higher or lower temperature value. In an embodiment, the temperature or a value characteristic of the temperature is detected for each individual preform. In this way, a constant or uniform quality can be ensured during the forming of the plastic preforms into the plastic containers.

In the event of a deviation in quality or temperature, suitable sensor and control technology can be used to adjust the oven control so that preforms of the same temperature arrive at the blow molding machine again and this difference is compensated for in the heating device.

Embodiments of the present invention are further directed to a method of forming plastic preforms into plastic containers, wherein a plurality of plastic preforms, which are arranged unsorted in a first preform store, are fed to an apparatus for forming plastic preforms, and the plastic preforms are brought into a predetermined position prior to feeding According to embodiments of the invention, at least one first preform store and at least one second preform store are provided, wherein a plurality of plastic preforms of exactly one production batch are arranged in each preform store.

Accordingly, it is also proposed on the method side, instead of providing a single preform store as is customary in the conventional art, to provide at least two preform stores, into each of which only one octabin of preforms or one production batch of preforms is tipped, so that no mixing of preforms from different production batches takes place.

In a preferred method, only plastic preforms from one of the two preform stores are fed to the apparatus first. In an method, the plastic preforms from the other preform store are fed to the apparatus after one preform store has been emptied.

Accordingly, it is also proposed on the method side that first only preforms from the first preform store are fed to the apparatus and only after the first preform store has been completely emptied are the preforms from the second preform store fed to the apparatus. It would also be possible to empty the second preform store first and then feed preforms from the first preform store.

In particular, the apparatus described above is adapted and intended to carry out this described method, i.e., all features disclosed for the apparatus described above are also disclosed for the method described herein and vice versa.

BRIEF DESCRIPTION

Some of the embodiments will be described in detail, with references to the following Figures, wherein like designations denote like members, wherein:

FIG. 1 shows a schematic representation of an apparatus according to embodiments of the invention with two preform stores.

DETAILED DESCRIPTION

FIG. 1 shows a schematic representation of an apparatus 1 according to embodiments of the invention with two preform stores 12, 14. Starting from these preform stores 12, 14, the plastic preforms 5 are fed to the apparatus 1 via a feeding device 2. In particular, only plastic preforms 5 of a preform store 12, 14 are fed to the device 1 first, in order to prevent mixing of the individual production batches. The reference sign 16 indicates in each case a sensor device which detects, for example, a filling level of the preform store and/or a value which is characteristic of the ability of the preforms to absorb temperature. In an embodiment, it is also possible that several sensor devices are provided which detect different values or several sensor devices are provided at different locations of the apparatus, as shown by the dashed lines of the apparatus provided with the reference sign 16.

Each preform store 12, 14 may comprise a feed belt 15a, 15b via which the preforms are fed to an elevator 17. However, it would also be conceivable that the preforms are fed directly to the elevator 17 without additional feed rails 15a, 15b. In the preform stores 12, 14, the feed rails 15a, 15b and the elevator 17, the preforms are present in unsorted form. An alignment device 8, here in the form of a roller sorter, is connected to the elevated conveyor 17 in order to align the preforms. In this embodiment, the alignment device 8 has two guide rails which are arranged parallel to one another and are spaced apart from one another in such a way that a base body of the plastic preforms 5 can pass through it, but a support ring 5a or other projecting part of the preform of the plastic preform 5 cannot.

The reference sign 19 indicates a feed starwheel, such as a feed starwheel, which feeds the aligned plastic preforms to a heating device 3. The heating device 3 is suitable and intended for heating the plastic preforms 5 to a temperature necessary for blow molding, wherein a plurality of heating elements 4 being arranged along the transport path T of the plastic preforms 5 for this purpose. The reference sign 7 identifies the further control device which can control the heating power of the heating elements 4 as a function of the characteristic value detected by the sensor device 16, and the reference sign 6 identifies the control device which is suitable and intended for controlling the feed of the plastic preforms 5 to the apparatus 1 in such a way, and in particular for controlling in such a way, that first only plastic preforms 5 are fed to the apparatus 1 from one of the two preform stores 12, 14. Instead of the feed starwheel 19 or also between the alignment device 8 and the feed starwheel 19, a feed rail (not shown) can also be arranged which feeds the preforms to the heating device 3 by gravity.

By a further feed starwheel 20, the heated plastic preforms 5 are fed to the blow molding machine 25 and here within blow stations 9 to the plastic containers 10. After forming, the plastic containers 10 are discharged from the blow molding machine 25 by a discharge starwheel 21. The reference sign D indicates in each case the direction of rotation of the feed and discharge starwheels and of the blow-moulding machine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS 1 apparatus
2 feeding device
3 heating device
4 heating elements
5 plastic preforms
5a support ring or other projection over the preform body
6 control device
7 further control device
8 alignment device
9 blowing station
10 plastic containers
12 first preform store
14 second preform store
15a, 15b feed rail
16 sensor device
17 elevator
18a, 18b guide rail
19 feed starwheel
20 feed starwheel 22 discharge starwheel
25 blow moulding machine
26 sensor device
D direction of rotation
T transport path of the plastic preforms 5

The invention claimed is:

1. An apparatus for forming plastic preforms into plastic containers, having a feeding device for feeding the plastic preforms to the apparatus, at least one first preform store, wherein a plurality of plastic preforms are arranged unsorted in the preform store, and having an alignment device for bringing the plastic preforms into a predetermined position before feeding them to the apparatus, wherein the apparatus has at least one second preform store, wherein a plurality of plastic preforms of precisely one production batch is accommodated in each of the first preform store and the second preform store.

2. The apparatus according to claim 1, wherein the apparatus has a control device which is suitable and intended for controlling the supply of the plastic preforms to the apparatus in such a way that firstly only plastic preforms from one of the two preform stores are supplied to the apparatus.

3. The apparatus according to claim 2, wherein the control device controls the first preform store and the second preform store in such a way that, after the one preform store has been emptied, the plastic preforms are fed to the apparatus from the other preform store.

4. The apparatus according to claim 1, wherein the supply of the plastic preforms from the first preform store and the supply of the plastic preforms from the second preform store is continuous.

5. The apparatus according to claim 1, wherein a heating device with a plurality of heating elements for heating the plastic preforms is arranged between the apparatus and the feeding device.

6. The apparatus according to claim 1, wherein the apparatus and in particular the feeding device and/or the first and second preform stores have at least one sensor device which detects at least one value characteristic of the ability of the preforms to absorb temperature.

7. The apparatus according to claim 5, wherein the heating device has a further control device) which controls the heating power of the heating elements as a function of the characteristic value detected by the sensor device.

8. A method for forming plastic preforms into plastic containers, wherein a plurality of plastic preforms, which are arranged unsorted in a first preform store, are fed to an apparatus for forming plastic preforms, and the plastic preforms are brought into a predetermined position before being fed, wherein at least one first preform store and at least one second preform store are provided, wherein a plurality of plastic preforms of exactly one production batch are arranged in each respective preform store.

9. The method according to claim 8, wherein the plastic preforms are initially fed to the apparatus from only one of the two preform stores.

10. The method according to claim 8, wherein after the one preform store has been emptied, the plastic preforms are fed to the apparatus from the other preform store.

11. An apparatus for forming plastic preforms into plastic containers, comprising:
a feeding device for feeding the plastic preforms to a heating device,
a first preform store, wherein a plurality of plastic preforms of a first production batch are accommodated in the first preform store,
a second preform store, wherein a plurality of plastic preforms of a second production batch are accommodated in the second preform store, and
an alignment device for bringing the plastic preforms into a predetermined position before feeding them to the heating device.

\* \* \* \* \*